UNITED STATES PATENT OFFICE 1,924,398

ULTRA VIOLET LIGHT TRANSPARENT GLASS

Camille Dreyfus, New York, N. Y.

No Drawing. Application September 28, 1929
Serial No. 396,010

5 Claims. (Cl. 49—81)

This invention relates to the making of laminated glass that is at least partially transparent to ultra-violet light and relates more particularly to laminated glass containing one or more sheets of a plastic material containing a derivative of cellulose and a plastifier that is transparent or translucent to such light.

An object of my invention is to produce a laminated glass that is at least partially transparent to ultra-violet rays. Further objects of my invention will appear from the following detailed description.

Laminated glass as now made is made of ordinary glass of commerce, which glass although transparent to light rays of the wave lengths in the range of the visible spectrum, is opaque to light of the short wave lengths of ultra-violet light. Ultra-violet light is of marked beneficial effect upon the human body and therefore glass that is permeable to this light is particularly desirable for use from this point of view. Glass made of quartz is transparent to such ultra-violet rays but is so expensive that its wide use is limited. Moreover, I have found that if such quartz glass is laminated with a plastic sheet containing cellulose derivatives and the ordinary plastifiers, the transparency to ultra-violet rays is greatly diminished if not totally lost, since most plastifiers are opaque to ultra-violet rays. However, I have found that plastic sheets containing derivatives of cellulose and the tartrate esters as plastifiers are transparent to ultra-violet light.

In accordance with my invention, I prepare a laminated glass that is at least partially transparent to ultra-violet light, by interposing between two or more sheets of glass of sufficiently high quartz content, one or more sheets of a plastic material containing a derivative of cellulose and an organic tartrate ester as plastifier.

The glass to be used in my invention may be made of pure quartz or silicon dioxide. However, the use of pure quartz glass is not absolutely necessary, since a glass containing merely a sufficiently large proportion of quartz will also serve for the purpose of this invention.

The cellulose derivative used for making the plastic material of which the intermediate sheets are composed may be cellulose nitrate or organic derivatives of cellulose such as organic esters of cellulose or cellulose ethers. Examples of organic esters of cellulose are cellulose acetate, cellulose formate, cellulose propionate and cellulose butyrate while examples of cellulose ethers are methyl cellulose, ethyl cellulose and benzyl cellulose. These cellulose derivatives are transparent or translucent to ultra-violet light, so that the laminated glass made in accordance with my invention is permeable to such light.

As stated, the plastifier used in conjunction with the derivative of cellulose for making the plastic sheets used in the laminated glass is a tartrate ester, which has the important property of not diminishing substantially the transparency of the derivative of cellulose to the ultra-violet light. While I prefer to use dibutyl tartrate, other esters of tartaric acid, such as diethyl tartrate or dibenzyl tartrate may be employed as plastifiers. While the proportion of the plastifier to the derivative of cellulose may be varied in accordance with the particular ones employed, it may be stated that by way of example dibutyl tartrate to the extent of 20 to 150%, say 50%, of the weight of cellulose acetate produces excellent results.

The plastic sheets to be interposed between the sheets of glass of high quartz content may be made in any suitable manner. Thus it may be made by cutting blocks of plastic material as is generally employed for making sheets or such sheets may be made by casting or extruding a solution of a derivative of cellulose in a volatile solvent, which solution has been filtered to remove foreign matter, onto smooth surfaces such as film-making wheels and permitting the volatile solvent to evaporate.

In order to cause the sheets of plastic material to adhere to the sheets of glass, a layer of a suitable adhesive may be interposed between said sheets and said glass and the whole pressed at elevated temperatures. Any suitable adhesive such as solutions of gelatin or solutions of synthetic resins of the fusible and soluble type such as phenol-formaldehyde or diphenylol propane formaldehyde resins, preferably containing a derivative of cellulose, may be employed as the laminating agent.

Obviously the total thickness of the final laminated glass may be varied to meet any required use. Likewise the ratio of the thickness of the layer of the plastic sheet containing the derivative of cellulose to the layer of glass may be varied. However, for reasons of economy, I prefer to use as thick a layer of material containing the cellulose derivative as possible. The plastic material containing the derivative of cellulose and the tartrate ester is highly transparent to ultra-violet light and therefore the use of thick layers thereof does not materially affect the transparency of the laminated glass to ultra-violet light. Since the layer or sheet of the plastic material may be made thick enough to impart strength and thickness to the laminated glass, quite thin sheets of glass may be used for making the laminated product to give the required rigidity thereto. Because of the thinness of the glass required, pure quartz glass may be used without raising the cost of the laminated products to a prohibitive amount. Moreover, since the laminated glass does not consist wholly of glass, the sheets of glass need not be of pure quartz but merely of a high quartz content without reducing the amount of transmitted ultra-violet rays to an objectionable extent.

The use of the tartrate ester such as dibutyl tartrate as plastifier not only is advantageous from the point of view of transparency to ultra-violet light, but its use produces a finished product of high clarity and great fastness to light.

Laminated glass made in accordance with my invention is applicable for use in conveyances such as automobiles, railroad coaches, etc., where a shatterless glass is required for safety and also for use in buildings of all kinds such as hospitals, homes, etc., where glass that is transparent to ultra-violet light is desirable.

It is to be understood that the foregoing detailed description is given merely by way of illustration and that many variations may be made therein without departing from the spirit of my invention.

Having described my invention what I claim and desire to secure by Letters Patent is:

1. Laminated glass comprising at least one sheet of glass that is substantially transparent to ultra-violet light and at least one layer of a plastic material containing a derivative of cellulose and a tartrate ester as plastifier.

2. Laminated glass comprising at least one sheet of glass that is substantially transparent to ultra-violet light and at least one layer of a plastic material containing cellulose acetate and a tartrate ester as plastifier.

3. Laminated glass comprising at least one sheet of glass that is substantially transparent to ultra-violet light and at least one layer of a plastic material containing a derivative of cellulose and dibutyl tartrate as plastifier.

4. Laminated glass comprising at least one sheet of glass that is substantially transparent to ultra-violet light and at least one layer of a plastic material containing an organic derivative of cellulose and dibutyl tartrate as plastifier.

5. Laminated glass comprising at least one sheet of glass that is substantially transparent to ultra-violet light and at least one layer of a plastic material containing cellulose acetate and dibutyl tartrate as plastifier.

CAMILLE DREYFUS.